March 18, 1969 — N. T. DICK — 3,433,926
ELECTRO-SLAG WELDING
Filed June 24, 1964 — Sheet 1 of 2

Inventor
Norman T. Dick
By *J. P. Moran*
Attorney

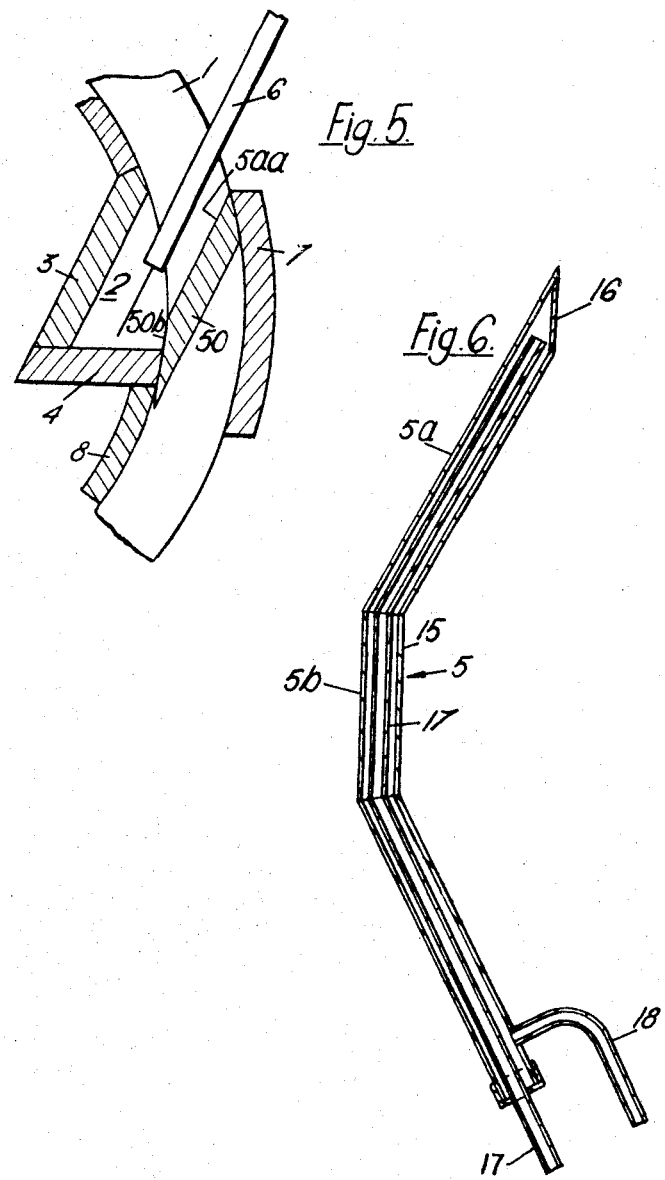

Patented Mar. 18, 1969

3,433,926
ELECTRO-SLAG WELDING
Norman T. Dick, London, England, assignor to Babcock & Wilcox Limited, London, England, a corporation of Great Britain
Filed June 24, 1964, Ser. No. 377,600
Claims priority, application Great Britain, June 25, 1963, 25,146/63
U.S. Cl. 219—137          8 Claims
Int. Cl. B23k 25/00

ABSTRACT OF THE DISCLOSURE

A method and apparatus for forming a circumferential electro-slag weld in a gap formed between two workpieces by a surface on each of the workpieces facing one another. A first pocket in which the weld may be initiated is formed by bridging the gap between the facing surfaces with a removable member having a contoured surface which extends within the gap. The contoured surface defines a suitable run-off contour for weld metal. The electro-slag weld is initiated in the first pocket thus formed. The weld metal, in contacting the contoured surface of the movable member, has a run-off contour formed thereon. After the weld is extended around the gap, the removable member is removed. A second pocket bounded by the facing surfaces of the workpieces and the run-off contour surface is used for completing the electro-slag weld, the weld metal being deposited in the second pocket and run-off the contoured surface.

Background and summary of the invention

This invention relates to welding and particularly to electro-slag welding. In making a circumferential weld between workpieces, for example, parts of a pressure vessel, by the electro-slag method of welding the workpieces are rotated in relation to the welding head until the initial part of the weld returns to the welding zone as the final part of the weld is made. The problem then arises of achieving adequate fusion into the metal deposited at the commencement of the welding operation. This may be done by cutting away metal from the initial part of the weld as by flame cutting or arc air gouging to provide the correct contour for a run-off at the end of the weld.

An object of the invention is to enable the necessity for cutting away metal from the initial part of the weld to be avoided.

According to the present invention there is provided a method of forming by electro-slag welding a circumferential weld in a gap between two workpieces, which method includes forming a pocket of which the boundaries include facing surfaces of the workpieces on opposite sides of the gap and a contour surface provided by a removable member, the contour surface extending within the gap and defining a suitable run-off contour, the method also including initiating the electro-slag welding in the pocket, extending the weld around the gap, removing the removable member thereby forming a further pocket, of which the boundaries include facing surfaces of the workpieces on opposite sides of the gap and the face of the initiating weld determined by the contour surface, and completing the circumferential electro-slag weld in said further pocket.

Brief description of the drawings

The present invention also provides apparatus for use in initiating a circumferential electro-slag weld in a gap between two workpieces including backing means bridging the workpieces on one side of the gap, and bounding on that side of the gap a space into which weld metal may be deposited, and a removable member providing a contour surface extending within the gap and defining a suitable run-off contour, the removable member also providing a further surface lying not outwardly of the gap and adjoining the contour surface, the further surface abutting the backing means across the width of the gap and forming a boundary of said space.

By way of example, an embodiment of the invention will now be described with reference to the accompanying somewhat diagrammatic drawings in which:

FIGURE 5 represents a cross-section similar to that shown in FIGURE 1 of a modified form of the apparatus shown in FIGURE 1; and FIGURE 6 shows in axial cross-section on an enlarged scale a detail of FIGURE 1.

Figure 1:
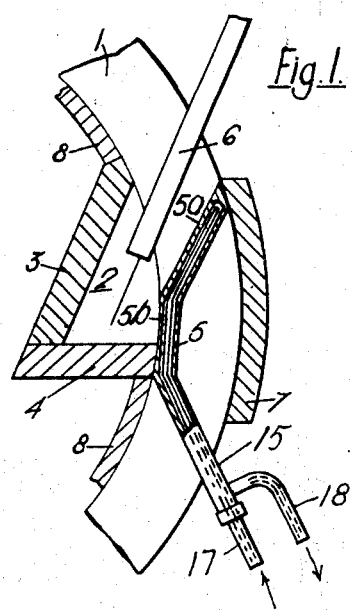
FIGURE 1 represents a cross-section through a part of a circumferentially extending gap, taken at one side of the gap, at the initiation of an electro-slag weld extending around the gap.
Figure 2:
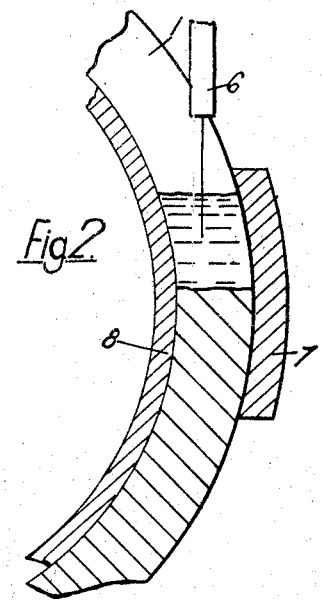
FIGURE 2 represents a similar cross-section indicating a subsequent stage in the formation of the weld.
Figure 3:
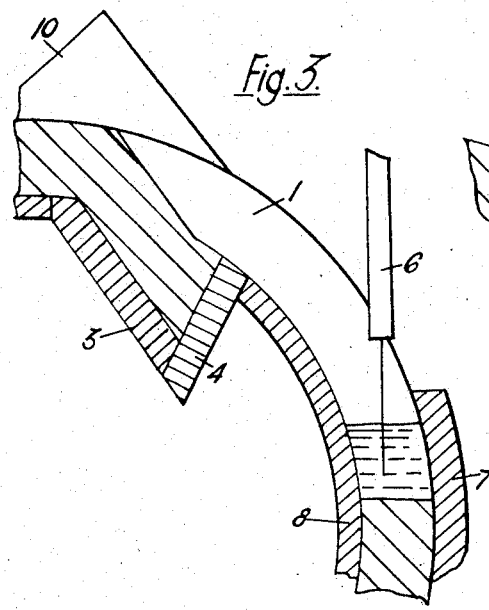
FIGURE 3 represents a similar cross-section indicating a stage towards the end of the formation of the weld.
Figure 4:
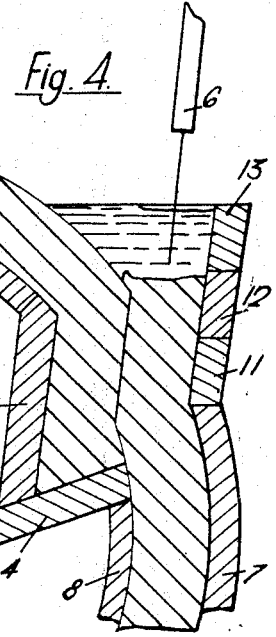
FIGURE 4 represents a similar cross-section indicating the final stage in the formation of the weld.

The embodiment of the invention that has been illustrated involves welding together by an electro-slag process the ends of two pipes of large diameter, the end 1 of one of which appears in FIGURES 1 to 4. The pipes are set up with an appreciate separation between their ends (which will depend upon the particular form of welding process adopted) in means which enable the pipes to be rotated simultaneously about their axes.

Description of the preference embodiments

A generally triangular steel plate 2 is tack welded to one of the pipes at the edge of the gap between the pipes and a similar plate 2, aligned with the first, is tack welded to the other pipe at the other edge of the gap. Blocks 3 and 4 are tack welded or otherwise held across the free edges of the plates 2 and a pocket in which the weld may be initiated is completed by means of the removable member 5.

The member 5 presents a surface 5a extending across the welding gap and the surface 5a is such that when weld metal is deposited in the pocket, the contour of the surface of the weld metal formed by contact with the surface 5a will be such as to enable the weld to be run-off at the conclusion of the welding process without further shaping. The surface 5a is parallel to the block 3 and is inclined across the gap at approximately 45°.

At one edge, the surface 5a meets a further surface 5b which is abutted by the edge of the plate 4. The surface 5b extends across the gap at its rearward limit and is aligned with the surfaces of the pipes on either side of the gap.

Thus, at the start of the welding process weld metal is deposited in the pocket by the welding electrode 6 and the pipes are then caused to revolve in a clockwise direction so that the entire length of the circumferential gap is rotated past the welding electrode 6. During the rotation of the pipes, the weld metal is retained in the gap until it has solidified by means of shoes 7, 8, at each side of the gap. In the particular process envisaged, it is proposed that the outer shoe 7, which may be in the form of a water-cooled copper block should remain stationary opposite the welding electrode whilst the inner shoe 8 should extend completely around the inner periphery of the pipes and rotate with the pipes. The inner shoe may be formed from a plurality of flexible water cooled backing straps such as are disclosed in our co-pending application No. 25,146/63. The inner shoe could alternatively be a shorter block, comparable with the shoe 7, past which the gap is rotated.

After the first pocket has moved away from the welding zone, further plates 10 of generally triangular form are tack welded one to each of the edges of the gap 1 on the opposite side of the gap from the plates 2. The outer edges of the plates 10 are parallel to the run-off contour of the metal deposited at the initiation of the weld. When the outer shoe reaches the plates 10, it remains there and a damming member 11 is held across the outer edges of the plates 10 to retain the molten weld metal as the electrode is raised past the run-off contour. Further damming members 12 and 13 are added as necessary. Thus, the welding process ends in a further pocket bounded by the run-off contour, plates 10, damming pieces 11, 12 and 13 and the newly deposited weld metal forming the bottom of the further pocket.

The blocks 3 and 4 may be water cooled blocks or be formed of a ceramic material such as zircon silicate. The damming pieces 11, 12 and 13 may also be water-cooled copper blocks.

The removable member 5 may, as shown in FIGURE 6, be provided by an outer copper tube 15 of rectangular cross-section, closed at its upper end 16. A tube 17 of circular cross-section extends longitudinally within the tube 15. Thus, cooling liquid may be sent into the lower end of the tube 15 and will be discharged towards the end 16 of the outer tube 15. The fluid will then return along the space between the tubes 15 and 17 to the outlet 18 at the lower end of the tube 15. The tubes 15 and 17 are so shaped that the outlet 18 lies on the side of the gap 1 from which the welding electrode 6 enters the gap.

In the modification of FIGURE 1 illustrated in FIGURE 5, the removable member is in the form of a ceramic block 50 providing surfaces 50a and 50b corresponding to surfaces 5a and 5b.

In one method embodying the invention for welding pipes having a wall thickness of 1¾", the gap between the pipes is 1¼". The electrode is positive, and made from 2% manganese steel having a diameter of 5/64". A D.C. generator supplies a welding current of 400 amps as 38 volts. To ensure adequate penetration of run-off, the voltage may be increased to 42 volts during the run-off. Such a process would require that the metal at the weld should subsequently be normalized. Normalizing may be avoided if controlled grain welding, such as is disclosed in our co-pending application No. 41,641/62 be adopted. In a controlled grain welding process embodying the invention, for welding together pipes having a wall thickness of 1¾", the gap between the pipes is ¾". The welding electrode is similar to that specified before but the D.C. generator supplies a welding current of 500 amps at 34 volts which is increased during the run-off to 36 volts. To establish electro-slag welding as quickly as possible, a current of 300 amps at 40 volts was supplied initially; fusion in such circumstances occurs at about 2" from the start so that the initial starting pocket should be of the order of 3" deep.

What in claimed is:

1. A method of forming a circumferential electro-slag weld in a gap formed between two workpieces by a surface on each of the workpieces facing one another comprising forming a first pocket in which the weld may be initiated by bridging the workpieces on one side of the gap so as to bound a space on that side of the gap and bridging the gap between the facing surfaces with a removable member having a contoured surface extending within the gap to define a suitable runoff contour for weld metal, initiating the electro-slag weld in the first pocket thus forming a run-off contour surface of weld metal, extending the weld around the gap, removing the removable member, forming a second pocket bounded by the facing surfaces of the workpieces on opposite sides of the gap and the run-off contour surface and a shoe, and completing the electro-slag weld in the second pocket by running the weld off the run-off contour surface.

2. The method as claimed in claim 1 including bridging the first pocket by mounting side plates on the respective workpieces on said one side of the gap and extending a member between the side plates.

3. The method as claimed in claim 2 including shaping the first pocket such that the weld metal deposited at the initiation of the electro-slag weld provides a second surface in addition to that defined by the contour surface, the second surface extending between the gap and acting as one of the boundaries of the second pocket.

4. The method as claimed in claim 3, in which the second surface is formed by defining the first pocket by means of a second surface on the removable member which abuts along its edge the contour surface.

5. The method as claimed in claim 1 including depositing weld metal between a flexible cooled backing strip pressed against the workpieces at one side of the gap and a cooled shoe at the other side of the gap during the extension of the weld around the gap.

6. The method as claimed in claim 1 including forming the second pocket by providing side plates on the respective workpieces on one side of the gap and fixing damming pieces across the further side plates to provide the second pocket between the damming pieces and the contour surface and the facing surfaces in which the circumferential weld may be completed.

7. The method as claimed in claim 6 including progressively raising the electro-slag electrode through the second pocket and adding the damming pieces in accordance with the movement of the electrode.

8. The method as claimed in claim 1 including increasing the welding voltage during run-off.

References Cited

UNITED STATES PATENTS 2,079,265   5/1937   Trainer _____ 219—137
3,211,887   10/1965  Cotterman.

RICHARD M. WOOD, *Primary Examiner.*

J. G. SMITH, *Assistant Examiner.*

U.S. Cl. X.R.

219—73